United States Patent
Niu

(10) Patent No.: US 9,360,700 B2
(45) Date of Patent: Jun. 7, 2016

(54) HALF-TRANSMITTING AND HALF-REFLECTING COLOR FILM SUBSTRATE, MANUFACTURE METHOD THEREOF AND LIQUID CRYSTAL DISPLAY DEVICE

(71) Applicant: BOE TECHNOLOGY GROUP CO., LTD., Beijing (CN)

(72) Inventor: Jing Niu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 138 days.

(21) Appl. No.: 14/127,299

(22) PCT Filed: Dec. 7, 2012

(86) PCT No.: PCT/CN2012/086196
§ 371 (c)(1),
(2) Date: Dec. 18, 2013

(87) PCT Pub. No.: WO2013/159537
PCT Pub. Date: Oct. 31, 2013

(65) Prior Publication Data
US 2014/0125931 A1    May 8, 2014

(30) Foreign Application Priority Data
Apr. 24, 2012   (CN) .......................... 2012 1 0122750

(51) Int. Cl.
*G02F 1/1335* (2006.01)
*G02F 1/1333* (2006.01)
(Continued)

(52) U.S. Cl.
CPC .... *G02F 1/133516* (2013.01); *G02F 1/133345* (2013.01); *G02F 1/133514* (2013.01); *G02F 1/133555* (2013.01); *G02B 5/201* (2013.01);
(Continued)

(58) Field of Classification Search
None
See application file for complete search history.

(56) References Cited

U.S. PATENT DOCUMENTS

| 8,111,359 B2 * | 2/2012 | Yang et al. ..................... 349/114 |
| 8,184,243 B2 * | 5/2012 | Kim et al. ..................... 349/106 |

(Continued)

FOREIGN PATENT DOCUMENTS

| CN | 1773314 A | 5/2006 |
| CN | 1975544 A | 6/2007 |
| CN | 102707484 A | 10/2012 |
| JP | 2004-218123 | 5/2004 |

OTHER PUBLICATIONS

First Office Action issued by the Chinese Patent Office for Chinese Patent Application No. 2012101227507 dated Mar. 26, 2014, 5pgs.

(Continued)

*Primary Examiner* — Dung Nguyen
*Assistant Examiner* — Shan Liu

(57) ABSTRACT

A half-transmitting and half-reflecting color film substrate, manufacture method thereof and liquid crystal display device are provided. The half-transmitting and half-reflecting color film substrate comprises a transparent substrate (1) and a black matrix (2) arranged on the transparent substrate (1). The black matrix (2) has a plurality of notches, and a plurality of color filters (3, 4, 5) are arranged in the notches of the black matrix (2). The plurality of color filters (3, 4, 5) are used for presenting different primary color, wherein the first color filter (5) of the plurality of color filters (3, 4, 5) is made of negative photosensitive resin, and the other color filters (3, 4) are made of positive photosensitive resin.

6 Claims, 4 Drawing Sheets

(51) Int. Cl.
  *G02B 5/23* (2006.01)
  *G02B 5/20* (2006.01)
(52) U.S. Cl.
  CPC ....... *G02B 5/23* (2013.01); *G02F 2001/133519* (2013.01)

(56) References Cited

U.S. PATENT DOCUMENTS

| | | | |
|---|---|---|---|
| 2004/0218123 | A1 | 11/2004 | Park et al. |
| 2005/0045891 | A1* | 3/2005 | Yamazaki et al. ............ 257/72 |
| 2005/0105021 | A1* | 5/2005 | Lee et al. ..................... 349/113 |
| 2005/0140915 | A1* | 6/2005 | Paek et al. ................... 349/155 |
| 2006/0050207 | A1* | 3/2006 | Igarashi et al. .............. 349/113 |
| 2014/0125931 | A1 | 5/2014 | Niu |

OTHER PUBLICATIONS

English translation of First Office Action issued by the Chinese Patent Office for Chinese Patent Application No. 2012101227507 dated Mar. 26, 2014, 2pgs.
English translation of Chinese Patent No. 1773314A, 25pgs.
English translation of Chinese Patent No. 1975544A, 31pgs.
English translation of Chinese Patent No. 102707484A, 22pgs.
International Search Report for International Application No. PCT/CN2012/086196, 13pgs.
PCT International Preliminary Report on Patentability, for PCT Application No. PCT/CN2012/086196, dated Oct. 28, 2014—7 pages.

* cited by examiner

HALF-TRANSMITTING AND HALF-REFLECTING COLOR FILM SUBSTRATE, MANUFACTURE METHOD THEREOF AND LIQUID CRYSTAL DISPLAY DEVICE

TECHNICAL FIELD

Embodiments of the invention relate to a transflective color filter substrate and a method of manufacturing the same, and a liquid crystal display device.

BACKGROUND

In general, the conventional liquid crystal displays may be classified into a transmissive type, a reflective type, and a transflective type according to the display manners thereof.

The transmissive type of liquid crystal display needs a backlight source disposed therein, and brightness can be brought to a panel of the display only when the light generated from the backlight source transmits through the panel. Therefore, it is hard to achieve the normal display via the transmissive type of liquid crystal display when the transmissive type of liquid crystal display is used in external environment, such as outdoors, where the light is relative stronger. It is needed for the reflective type of liquid crystal display to apply a reflective film to a lower glass substrate of the panel, and the display is achieved by reflecting the light in external environment. The reflective type of liquid crystal display has less power consumption than the transmissive type of liquid crystal display, since it has no backlight source; but some problems such as poor display quality may be caused when the light in the external environment, i.e., the light source, is faint. Therefore, the transflective type of liquid crystal display, which has the functions of both the transmissive type of liquid crystal display and the reflective type of liquid crystal display, has drawn wide attentions. When the light in external environment is strong, the panel reflects the incident light from the external environment to reach the object of emitting light; but when the light in external environment is faint, the panel reaches the object of emitting light using the backlight source, so that the transflective type of liquid crystal display has better outdoor visibility and a reflective effect, and thus has much wider use.

A transflective color filter substrate is an important member in the transflective type of liquid crystal display, and the reflective effect of the transflective color filter substrate on the light in external environment influences directly the display effect of the transflective type of liquid crystal display.

In general, a transparent substrate 1, a black matrix 2, three color filter films 3, 4, and 5 (corresponding to three primary colors of red, green, and blue, respectively), a reflective film 6, an insulating layer 7 (i.e., an OC layer), and a common electrode layer 8 (i.e., an ITO layer) are disposed in the structure of the conventional transflective color filter substrate (using the three primary colors of red, green, and blue as examples) as shown in FIG. 1. The manufacture process of the transflective color filter substrate having the above structure needs 5 mask exposures, which comprise: firstly coating a black photoresist on the transparent substrate, then performing the first mask exposure, and forming the black matrix (BM) having openings on the transparent substrate after developing; next performing the second mask exposure to form a first type of color filter films in the openings of the BM; then performing the third and fourth mask exposures in the same way to form the other two types of color filters in adjacent openings of the BM; and then sputtering a metal layer of the reflective film and coating a photosensitive resin (i.e., PR adhesive) on the color filter film and the BM, and forming the reflective film 6 located on the BM and having a certain pattern after subjected to the fifth mask exposure, a developing and wet etching. At last, the insulating layer 7 and the common electrode layer 8 are formed.

FIG. 1 is a cross-section view of a transflective color filter substrate manufactured using the conventional process.

In the conventional process of forming the transflective color filter substrate, all the five mask exposures are performed on the front side of the color filter substrate (a side of the color filter substrate where the color filter films are disposed), i.e., the top of the color filter substrate, and need special masks to perform the exposures. The color filter substrate needs to be aligned with the masks precisely in the process; and once the mask shifts from the color filter substrate beyond a minute value, the upper and lower patterns will not match each other, and some serious problems, such as light leakage of the panel, abnormal display, and so on, will be caused. Therefore, the conventional process of manufacturing the transflective color filter substrate becomes relative complex.

SUMMARY

In an embodiment of the invention, a transflective color filter substrate is provided, which comprises: a transparent substrate; a black matrix disposed on the transparent substrate, the black matrix having a plurality of openings; and a plurality of color filters disposed in the openings of the black matrix, the plurality of color filters being used to display different primary colors, wherein the material of a first color filter among the plurality of color filters is of a negative photosensitive resin, and the material of the other color filters is of a positive photosensitive resin.

In another embodiment of the invention, a method of manufacturing a transflective color filter substrate is provided, which comprises: coating a layer of negative photosensitive resin on a black matrix, other color filters, and openings of the black matrix, which have been formed on a transparent substrate, to form a negative photosensitive resin layer, coating a layer of positive photosensitive resin on the negative photosensitive resin layer to form a positive photosensitive resin layer, forming a reflective-filmed layer on the positive photosensitive resin layer, the other color filters being color filters the material of which is a positive photosensitive resin, performing a back exposure from a bottom side of the transparent substrate; performing a developing process on the exposed positive photosensitive resin layer, removing the positive photosensitive resin layer and the reflective-filmed layer above locations corresponding to the other color filters and a first color filter to expose the negative photosensitive resin layer above the locations corresponding to the other color filters and the first color filter; and performing an ashing process on the negative photosensitive resin layer above the locations corresponding to the other color filters and the first color filter to remove the negative photosensitive resin layer covering the other color filters and form the first color filter.

In another embodiment of the invention, a liquid crystal display device is provided, which comprises a transflective liquid crystal display panel including the above mentioned transflective color filter substrate.

BRIEF DESCRIPTION OF THE DRAWINGS

For better understanding technical proposals according to embodiments of the present invention, drawings of the embodiments will be described briefly below. Obviously, drawings in the following description only relate to some embodiments of the present invention, not to limit the present invention.

DETAILED DESCRIPTION

Figure 1:
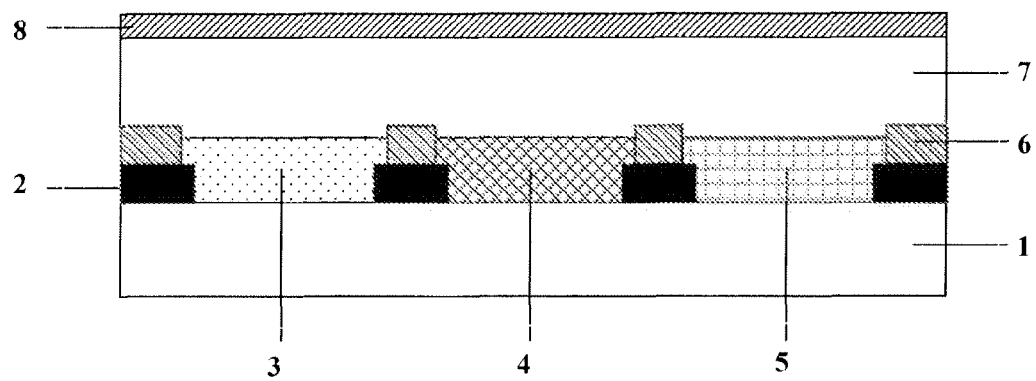
FIG. 1 is a cross section view of a transflective color filter substrate manufactured using the conventional process.

In order to make the purpose, technology solution and advantages of embodiments of the present invention more clear, technology solutions according to embodiments of the present invention will be described clearly and completely below with respect to drawings of embodiments of the present invention. It is to be understood that the described embodiments are part of but not all of embodiments of the present invention. Based on the described embodiments of the present invention, all other embodiments obtained by those of ordinary skill in the art without any creative labor fall into the protecting scope of the present invention.

Embodiments of the invention provide a transflective color filter substrate and a method of manufacturing the same, so that the manufacturing process of the transflective color filter substrate is simplified. In addition, embodiments of the invention also provide a liquid crystal display device including the aforementioned transflective color filter substrate.

Hereinafter, a transflective color filter substrate provided according to an embodiment of the invention will be described in detail with reference to FIG. 2. In the embodiment of the invention, as shown in FIG. 2, the transflective color filter substrate may include: a transparent substrate 1; a black matrix 2 disposed on the transparent substrate 1, the black matrix 2 having a plurality of openings; a plurality of color filters (for example color filters 3, 4, and 5) disposed in the openings of the black matrix 2 to display different primary colors, wherein a first color filter 5, which is formed finally by performing a back exposure from a bottom side of the transparent substrate 1, is made of material of a negative photosensitive resin, and the other color filters (comprising the color filter 3 and the color filter 4), which are formed by performing a front mask exposure from a top side of the transparent substrate 1 before forming the first color filter, is made of material of a positive photosensitive resin.

In the embodiment of the invention, the transflective color filter substrate may further include: a negative photosensitive resin layer 10 disposed on the black matrix 2; a positive photosensitive resin layer 9 disposed on the negative photosensitive resin 10; and a reflective-filmed layer 6 disposed on the positive photosensitive resin layer 9.

In the embodiment of the invention, the transflective color filter substrate may further include: an insulating layer 7 disposed on the reflective-filmed layer 6 and the color filters 3, 4, and 5; and a common electrode layer 8 disposed on the insulating layer 7.

Figure 2:
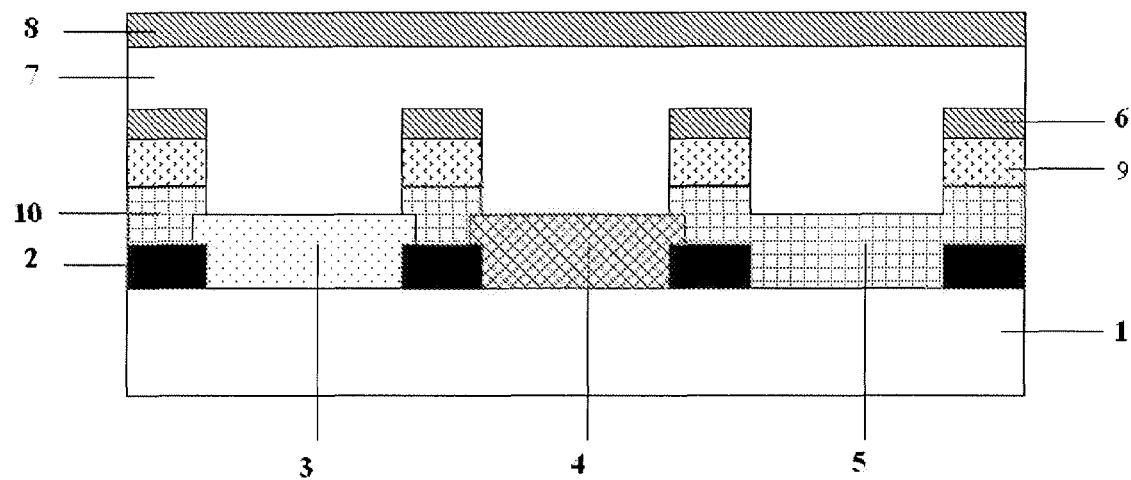
FIG. 2 is a cross section view of a transflective color filter substrate according to an embodiment of the invention.

It should be noted herein that the transflective color filter substrate shown in FIG. 2 is only an exemplary example rather than a limitative example, in which the related primary colors may be of three primary colors such as red, green, and blue primary colors, which are displaced by the color filters 3, 4, and 5 shown in FIG. 2, respectively. However, the transflective color filter substrates provided according to the embodiments of the invention need not include only three color filters. For example, the transflective color filter substrate provided according to the embodiments of the invention may include four color filters, five color filters, or the like, which correspond to four primary colors, five primary colors, respectively.

It should be noted further that all the first color filters in the embodiments of the invention are the finally formed color filters (material of which is a negative photosensitive resin), and the other color filters are the color filters (material of which is a positive photosensitive resin) formed before the formation of the first color filter, no matter there are three color filters, four color filters, or more color filters.

In addition, the transflective color filter substrates provided according to the embodiments of the invention improve the structure, the material, and the manufacture process of the conventional transflective color filter substrate, but have no negative influences on the functions of the color filter substrate.

In order to manufacture the transflective color filter substrate as shown in FIG. 2, an embodiment of the invention further provides a method for manufacturing the transflective color filter substrate, which comprises:

Step 31, in which a layer of negative photosensitive resin is coated on the black matrix 2, the other color filters (for example the color filters 3 and 4), and the openings of the black matrix 2, which have been formed on the transparent substrate 1, to form the negative photosensitive resin layer 10, a layer of positive photosensitive resin is subsequently coated on the negative photosensitive resin layer 10 to form the positive photosensitive resin layer 9, and thereafter the reflective-filmed layer 6 is formed on the positive photosensitive resin layer 9, wherein the other color filters are of color filters material of which is positive photosensitive resin;

Step 32, in which the back exposure is performed from the bottom side of the transparent substrate 1;

Step 33, in which a developing process is performed on the exposed positive photosensitive resin layer 9, and the positive photosensitive rein layer 9 and the reflective-filmed layer 6 above locations to which the other color filters (for example the color filters 3 and 4) and the first color filter 5 correspond are removed to expose the negative photosensitive resin layer 10 above the locations to which the other color filters (for example the color filters 3 and 4) and the first color filler 5 correspond;

Step 34, in which an ashing process is performed on the negative photosensitive resin layer 10 on the locations to which the other color filters (for example the color filters 3 and 4) and the first color filter 5 correspond to remove the negative photosensitive resin layer 10 covering the other color filters (for example the color filters 3 and 4) and form the first color filter 5.

In the method of manufacturing the transflective color filter substrate provided in the embodiments of the invention, the patterns or structures, the formation of which needs two front mask exposures in the prior art, may be achieved with one back exposure, so that the manufacture process of the transflective color filter substrate is simplified; and the back exposure in the embodiment of the invention uses the patterns of structures having been formed on the transparent substrate 1 as masks, and thus is of an self-aligned exposure, so that the precision of the back exposure is assured and the yield of products is improved effectively.

In addition, before coating one layer of negative photosensitive resin on the black matrix 2 the other color filters (for example the color filters 3 and 4), and the openings of the black matrix 2 having been formed on the transparent substrate 1 to form the negative photosensitive resin layer 10, the method of manufacturing the transflective color filter substrate provided according to the embodiment of the invention may further comprise:

coating a layer of black photoresist on the transparent substrate 1; and performing a front mask exposure on the black photoresist from the top side of the transparent substrate 1 and developing the exposed black photoresist to form the black matrix 2 having the openings.

In addition, before coating one layer of negative photosensitive resin on the black matrix 2, the other color filters (for example, the color filters 3 and 4), and the openings of the black matrix 2 having been formed on the transparent substrate 1 to form the negative photosensitive resin layer 10, the method of manufacturing the transflective color filter substrate provided according to the embodiment of the invention may further comprise:

forming the other color filters (for example, the color filters 3 and 4), the material of which is of a positive photosensitive resin, sequentially by front mask exposures at the openings of the black matrix 2, wherein the times of the front mask exposures in this step correspond to the number of the primary colors that will be displayed by the other color filters. For example, when a color filter corresponding to red color needs to be formed, there needs to perform the front mask exposure one time; when a color filter corresponding to green color needs to be formed, there needs to perform the front mask exposure another time; and the similar processes are performed repeatedly till all the other color filters are completed.

In addition, after forming the first color filter, the method of manufacturing the transflective color filter substrate provided in the embodiments of the invention may further comprise:

forming the insulating layer 7 on the color filters and the remained reflective-filmed layer 6; and forming the common electrode layer 8 on the insulating layer 7.

Hereinafter, for easy understanding of the method of manufacturing the transflective color filter substrate provided according to the embodiment of the invention, an exemplary embodiment of the method will be described in detail with reference to FIG. 3 through FIG. 13.

In this embodiment, the method is used to form a transflective color filter substrate that includes three color filters (i.e., the color filters 3, 4, and 5 as shown in FIG. 2) corresponding to three primary colors.

In the embodiment, the method may comprise:

Step 1 in which the black matrix is formed on the transparent substrate 1.

Figure 3:
FIG. 3 is the first view showing a method of manufacturing the transflective color filter substrate according to the embodiment of the invention.
Figure 4:
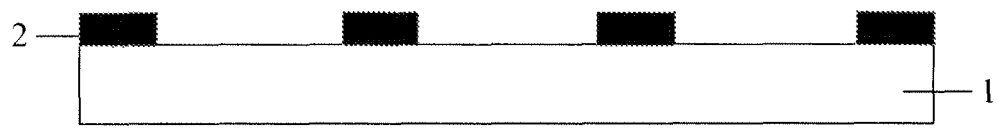
FIG. 4 is the second view showing a method of manufacturing the transflective color filter substrate according to the embodiment of the invention.

In the embodiment of the invention, the process of forming the black matrix (BM) may be the same as those in the prior art. As shown in FIG. 3, firstly, a layer of black photoresist is coated on the transparent substrate 1. Then, a front mask exposure is performed on the black photoresist one time, i.e., performing the first front mask exposure on the transparent substrate 1 from the top side or the transparent substrate 1, and the exposed black resist is developed, so that the black matrix 2 (i.e., BM 2) having openings as shown in FIG. 4 is formed.

Step 2 in which the color filters 3 and 4 are formed.

Figure 5:
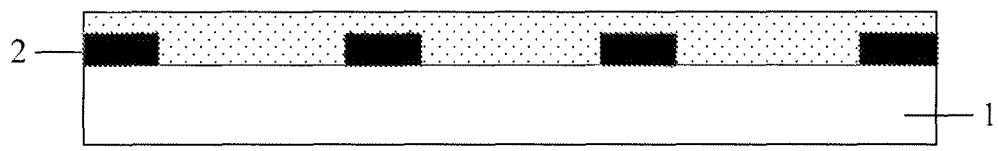
FIG. 5 is the third view showing a method of manufacturing the transflective color filter substrate according to the embodiment of foe invention.
Figure 6:
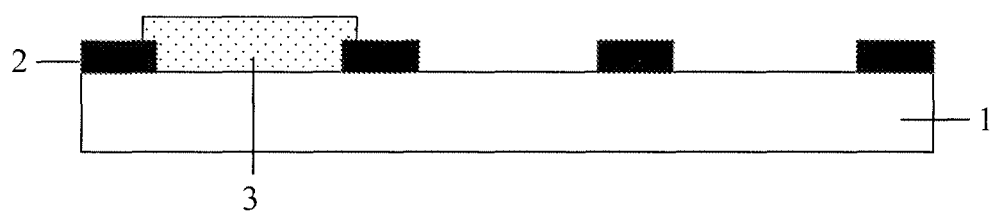
FIG. 6 is the fourth view showing a method of manufacturing the transflective color filter substrate according to the embodiment of the invention.
Figure 7:
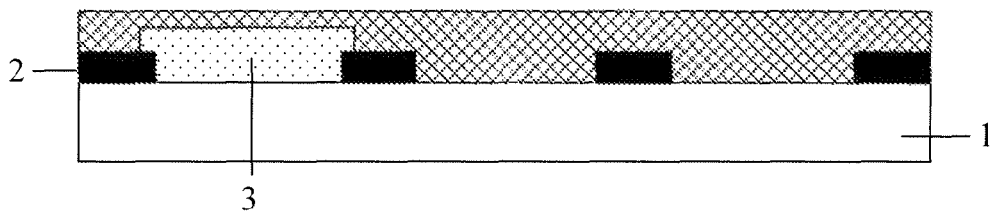
FIG. 7 is the fifth view showing a method of manufacturing the transflective color filter substrate according to the embodiment of the invention.
Figure 8:
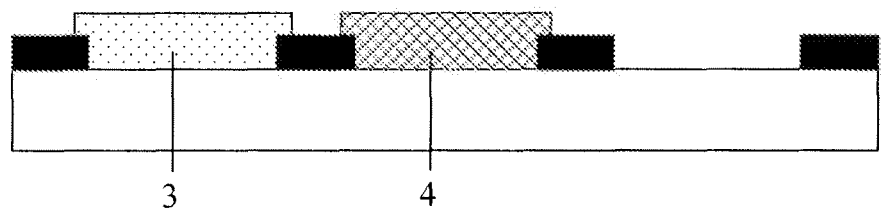
FIG. 8 is the sixth view showing a method of manufacturing the transflective color filter substrate according to the embodiment of the invention.

In the embodiment of the invention, the process for forming the color filters 3 and 4 may be the same of the prior art. As shown in FIG. 5, a layer of positive photosensitive resin is coated firstly on the transparent substrate 1 on which the black matrix 2 has been formed. Then, a front mask exposure is performed on the coated positive photosensitive resin layer (it should be noted that the positive photosensitive resin layer exposed this time is not the positive photosensitive resin layer 9 disposed in the color filter substrate), i.e., performing the second front mask exposure from the top side of the transparent substrate 1, so as to form the color filter 3 shown in FIG. 6 the material of which is a positive photosensitive resin. Then, as shown in FIGS. 7 and 8, the color filter 4 is formed via the same forming process, i.e., through the third front mask exposure, the material of which is a positive photosensitive resin, too.

Step 3 in which the negative photosensitive resin layer 10, the positive photosensitive resin layer 9, the reflective-filmed layer 6, and the color filter 5 are formed.

In the embodiment of the invention, the process of forming the color filter 5 differs from the prior art. For example, the process may include following steps.

Firstly, a layer of negative photosensitive resin is coated on the transparent substrate 1, the thickness of which is larger than those of the other two color filters a little.

Figure 9:
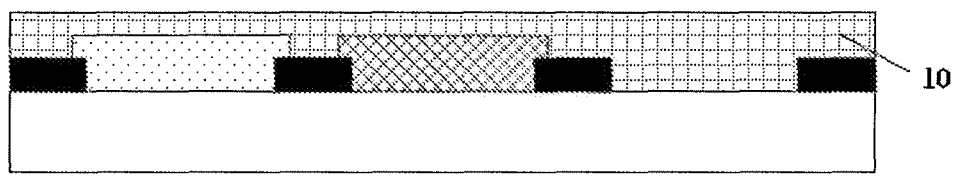
FIG. 9 is the seventh view showing a method of manufacturing the transflective color filter substrate according to the embodiment of the invention.

Then, the upper surface of the negative photosensitive resin is leveled to form the negative photosensitive resin layer 10, as shown in FIG. 9.

Next, a layer of positive photosensitive resin, i.e., photoresist, is coated directly on the negative photosensitive resin layer 10 to form the positive photosensitive resin layer 9.

Figure 10:
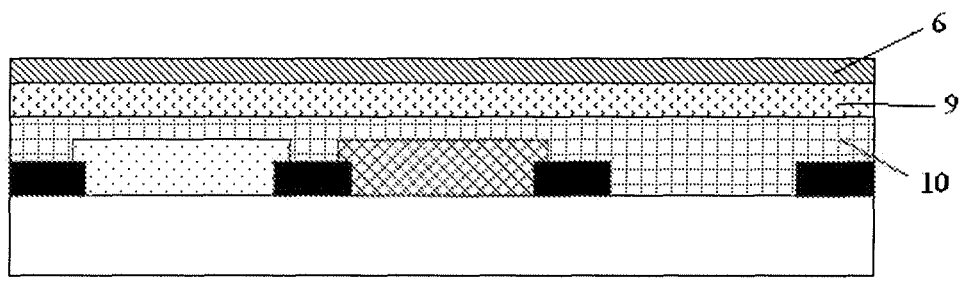
FIG. 10 is the eighth view showing a method of manufacturing the transflective color filter substrate according to the embodiment of the invention.

Then, the reflective-filmed layer 6 is formed on the positive photosensitive resin layer 9 by for example sputtering, as shown in FIG. 10.

In the embodiment of the invention, the reflective-filmed layer 6 may be formed of metal material, which may be aluminum (Al), silver (Ag), gold (Au), and alloys thereof, or may be other metal or alloy, such as metal platinum (Pt), chromium (Cr), copper (Cu), or the like, which has high reflectivity.

After forming the negative photosensitive resin layer 10, the positive photosensitive resin layer 9, and the reflective-filmed layer 6, a back exposure is performed from the bottom side (i.e., the lower side) of the transparent substrate 1.

Figure 11:
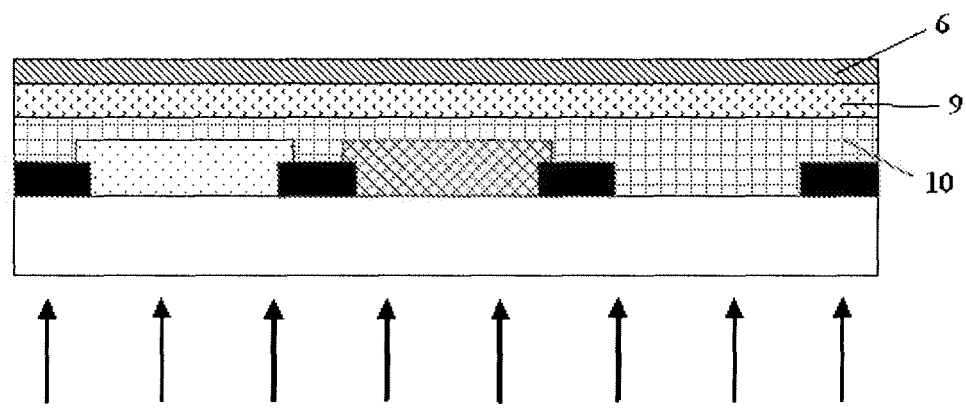
FIG. 11 is the ninth view showing a method of manufacturing the transflective color filter substrate according to the embodiment of the invention.

In the embodiment of the invention, the back exposure needs no mask, but uses directly the patterns of the BM 2 and the color filters 3 and 4 having been formed on the substrate as mask to perform the self-aligned exposure. The BM 2 is opaque, but the color filters 3 and 4 may be transparent, as shown in FIG. 11.

Figure 12:
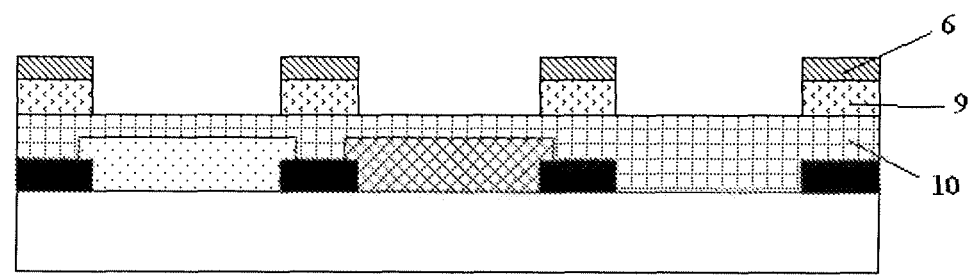
FIG. 12 is the tenth view showing a method of manufacturing the transflective color filter substrate according to the embodiment of the invention.

After performing the exposure, the transparent substrate 1 is developed using a developer solution for positive photoresist, i.e., removing the exposed positive photosensitive resin layer 9 above the locations corresponding to the patterned color filters 3 and 4 and color filter 5, and since the exposed positive photosensitive resin layer 9 is removed, the reflective-filmed layer 6 thereon is peeled off accordingly, so that the color filter substrate as shown in FIG. 12 is formed.

It can be seen from FIG. 12 that portions of the negative photosensitive resin layer 10, i.e., the negative photosensitive resin layer 10 above the locations corresponding to the color filters 3 and 4 and the color filter 5, have been exposed to outside.

Next, an ashing process may be performed on the negative photosensitive resin layer 10 exposed to outside to remove the negative photosensitive resin layer covering the color filters 3 and 4, so as to expose the color filters 3 and 4 the material of which is a positive photosensitive resin. At the same time, the ashing process may also be performed on the negative photosensitive resin layer 10 above the location corresponding to the color filter 5 so as to form the color filter 5 the material of which is a negative photosensitive resin.

Figure 13:
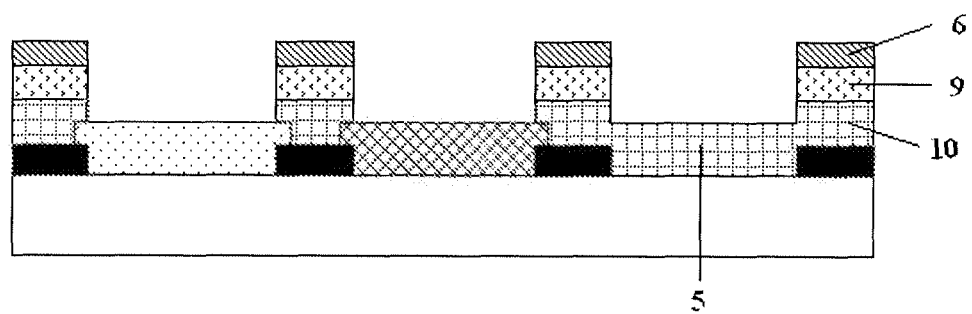
FIG. 13 is the eleventh view showing a method of manufacturing the transflective color filter substrate according to the embodiment of the invention.

As shown in FIG. 13, the color filter substrate may be formed through the above processes, on which the BM 2 and the three color filters are arranged alternately and the BM is covered with the reflective-filmed layer 6.

Step 4 in which the insulating layer (for example an OC layer) 7 is coated on the substrate and the common electrode layer (for example an ITO layer) 8 is sputtered on the substrate. Finally, the transflective color filter substrate as shown in FIG. 2 is obtained.

As described above, the method of manufacturing the transflective color filter substrate provided in the embodiment of the invention is a completely novel process, in which three mask exposures and one self-aligned exposure are need in total, and saves one exposure compared to the prior art that performs 5 mask exposures (only with regard to three color filters), so that the difficulty of the process is lowered down substantially, the steps of the process are reduced, the yield of products is improved effectively, and the manufacture cost is decreased beneficially.

In addition, when the exposure is performed on the transparent substrate 1 from the back side thereof in the embodiment of the invention, the self-aligned exposure may be performed by using the patterns having been formed on the transparent substrate 1 as a mask, which saves one alignment of mask. That is to say, the whole manufacturing process needs only to perform three mask alignments and one simple self-aligned exposure, which simplifies the manufacture process of the transflective color filter substrate substantially.

On the basis of the transflective color filter substrate that is manufactured using the method of manufacturing the transflective color filter substrate provided according to the embodiment of the invention, embodiments of the invention may further provide a liquid crystal display device that may include a transflective liquid crystal display panel.

In the embodiments of the invention, the transflective liquid crystal display panel may include: an array substrate, the transflective color filter substrate as shown in FIG. 2, and a liquid crystal layer disposed between the transflective color filter substrate and the array substrate.

In addition, embodiments of the invention may further provide an electric product including the liquid crystal display device provided according to the embodiments of the invention, and the liquid crystal display device includes the transflective color filter substrate as shown in FIG. 2.

The above embodiments are only for the purpose of describing technical proposal of the present invention rather than limiting it. While the present invention has been described in detail with reference to the above-mentioned embodiments, those of ordinary skill in the art should understand that they can modify the technical solution recorded in the above embodiments or conduct equivalent substitution for a part of technical features thereof and these modifications or substitutions will not make the nature of respective technical solution to depart from the spirit and scope of technical solutions of embodiments of the present invention.

The invention claimed is:

1. A method of manufacturing a transflective color filter substrate comprising:
   a transparent substrate;
   a black matrix disposed on the transparent substrate, the black matrix having a plurality of openings; and
   a plurality of color filters disposed in the openings of the black matrix, the plurality of color filters being used to display different primary colors,
   wherein a material of a first color filter among the plurality of color filters is a negative photosensitive resin, and a material of other color filters is a positive photosensitive resin,
   the method comprising:
   coating a layer of negative photosensitive resin on the black matrix, the other color filters, and the openings of the black matrix, which have been formed on the transparent substrate, to form a negative photosensitive resin layer, coating a layer of positive photosensitive resin on the negative photosensitive resin layer to form a positive photosensitive resin layer, forming a reflective-filmed layer on the positive photosensitive resin layer, the other color filters being color filters the material of which is the positive photosensitive resin;
   performing a back exposure from a bottom side of the transparent substrate;
   performing a developing process on the exposed positive photosensitive resin layer, removing the positive photosensitive resin layer and the reflective-filmed layer above locations corresponding to the other color filters and the first color filter to expose the negative photosensitive resin layer above the locations corresponding to the other color filters and the first color filter; and
   performing an ashing process on the negative photosensitive resin layer above the locations corresponding to the other color filters and the first color filter to remove the negative photosensitive resin layer covering the other color filters and form the first color filter.

2. The method of claim 1, wherein, before coating the layer of negative photosensitive resin on the black matrix, the other color filters, and the openings of the black matrix, which have been formed on the transparent substrate, to form the negative photosensitive resin layer, the method further comprises:
   coating a layer of black photoresist on the transparent substrate; and
   performing a front mask exposure on the black photoresist from a top side of the transparent substrate and performing a developing process on the exposed black photoresist, so as to form the black matrix having the openings.

3. The method of claim 2, wherein, before coating the layer of negative photosensitive resin on the black matrix, the other color filters, and the openings of the black matrix, which have been formed on the transparent substrate, to form the negative photosensitive resin layer, the method further comprises:

forming in sequence the other color filters, the material of which is the positive photosensitive resin, at the openings of the black matrix through front mask exposures, in which the times of the front mask exposures correspond to a number of primary colors that are displayed by the other color filters.

4. The method of claim 3, wherein, after forming the first color filter, the method further comprises:

forming an insulating layer on the plurality of color filters and the remained reflective-filmed layer; and forming a common electrode layer on the insulating layer.

5. The method of claim 2, wherein, after forming the first color filter, the method further comprises:

forming an insulating layer on the plurality of color filters and the remained reflective-filmed layer;

and forming a common electrode layer on the insulating layer.

6. The method of claim 1, wherein, after forming the first color filter, the method further comprises:

forming an insulating layer on the plurality of color filters and the remained reflective-filmed layer; and forming a common electrode layer on the insulating layer.

* * * * *